(12) United States Patent
Cesarini et al.

(10) Patent No.: US 6,776,204 B2
(45) Date of Patent: Aug. 17, 2004

(54) TIRE HAVING A PATTERN WITH NO INTERCOMMUNICATING PATHS BETWEEN THE GROOVES

(75) Inventors: Riccardo Cesarini, Bergamo (IT); Ernesto Cerizza, Besana Brianza (IT)

(73) Assignee: Pirelli Pneumatici S.p.A., Milan (IT)

( * ) Notice: Subject to any disclaimer, the term of this patent is extended or adjusted under 35 U.S.C. 154(b) by 72 days.

(21) Appl. No.: 09/859,507

(22) Filed: May 18, 2001

(65) Prior Publication Data

US 2002/0000278 A1 Jan. 3, 2002

Related U.S. Application Data

(63) Continuation of application No. PCT/EP99/08716, filed on Nov. 12, 1999.
(60) Provisional application No. 60/110,169, filed on Nov. 27, 1998.

(30) Foreign Application Priority Data

Nov. 19, 1998 (EP) .............................................. 98121936

(51) Int. Cl.⁷ ..................... B60C 11/117; B60C 103/04; B60C 111/00; B60C 115/00
(52) U.S. Cl. .............................. 152/209.8; 152/209.17; 152/209.28
(58) Field of Search .......................... 152/209.2, 209.8, 152/209.11, 209.17, 209.28, 903

(56) References Cited

U.S. PATENT DOCUMENTS

| | | | | |
|---|---|---|---|---|
| 2,104,532 A | * | 1/1938 | Sommer | |
| 2,759,512 A | * | 8/1956 | Schlichtmann | |
| 3,115,919 A | | 12/1963 | Roberts | ...................... 152/209 |
| 4,171,676 A | | 10/1979 | Kennel | ......................... 116/34 |
| 4,350,359 A | * | 9/1982 | Van Gompel | ............... 280/203 |
| 4,424,846 A | * | 1/1984 | Seitz et al. | |
| 4,641,696 A | | 2/1987 | Semin et al. | ............... 152/209 |
| 4,700,762 A | | 10/1987 | Landers | ...................... 152/209 |
| 4,832,099 A | | 5/1989 | Matsumoto | ................. 152/209 |
| 5,472,030 A | | 12/1995 | Shibata et al. | ............. 152/209 |
| 6,070,631 A | * | 6/2000 | Armellin et al. | |

FOREIGN PATENT DOCUMENTS

| | | |
|---|---|---|
| EP | 0 867 311 A2 | 9/1998 |
| FR | 466.484 | 5/1914 |

(List continued on next page.)

OTHER PUBLICATIONS

W. Takeshi, "Pneumatic Radial Tire", Patent Abstracts of Japan of JP 09156317A, Jun. 17, 1997.

(List continued on next page.)

*Primary Examiner*—Steven D. Maki
(74) *Attorney, Agent, or Firm*—Finnegan, Henderson, Farabow, Garrett & Dunner L.L.P.

(57) ABSTRACT

A tire for vehicle wheels includes a tread band having a tread pattern defined between two shoulder ends of the tire. The tread pattern includes two lateral rows of grooves and at least one third row of grooves arranged between the lateral rows. All of the grooves are separate from one another so as to produce a pattern with no intercommunicating paths between the grooves. End portions of the grooves of the at least one third row extend outside a footprint of the tire. A dimension of each of the grooves of the at least one third row relative to a length of the tire footprint causes water drainage from underneath the tire footprint. A tire including the ability for acoustically signalling low air pressure, a method for checking tire air pressure using an acoustic signal, and an acoustic signalling device for vehicle wheels are also disclosed.

36 Claims, 6 Drawing Sheets

FOREIGN PATENT DOCUMENTS

| | | | |
|---|---|---|---|
| FR | 2183615 | | 12/1973 |
| FR | 2 183 615 | | 12/1973 |
| FR | 2201982 | | 5/1974 |
| FR | 2 201 982 | | 5/1974 |
| FR | 2496562 | | 6/1982 |
| FR | 2 496 562 | | 6/1982 |
| GB | 29268 | | of 1914 |
| GB | 2 114 069 A | | 8/1983 |
| JP | 63-116907 | * | 5/1988 |
| JP | 2-133206 | * | 5/1990 |
| JP | 3-10909 | * | 1/1991 |
| JP | 5-58109 | * | 3/1993 |

OTHER PUBLICATIONS

Yokohama Rubber Co., Ltd., "High Speed Car Radial Tyre Improve Wet Performance Sacrificial Dry Performance Tread Profile Forming Two Circular Axis Meridian Cross-Section" Abstract of JP 05 058109, Mar. 9, 1993.

Yohohama Rubber Co., Ltd., "Pneumatic Radial Type Improve Steer Stabilised Straight Run Performance One Supplementary Main Groove Side Region Main Groove", Abstract of JP 04 215504, Aug. 6, 1992.

Bridgestone Corp., "Pneumatic Tire for Motorcycle", Abstract of JP 05 201207, Aug. 10, 1993.

Bridgestone Corp., "Pneumatic Tyre Reduce Road Noise Circumference Tread Groove Space Specific Distance Apart Correspond Ground Contact Area Load", Abstract of JP 03 010909, Jan. 18, 1991.

* cited by examiner

TIRE HAVING A PATTERN WITH NO INTERCOMMUNICATING PATHS BETWEEN THE GROOVES

CROSS-REFERENCES TO RELATED APPLICATIONS

This application is a continuation of International Patent Application No. PCT/EP99/08716, filed Nov. 12, 1999, in the European Patent Office; additionally, Applicants claim the right of priority under 35 U.S.C. § 119(a)–(d) based on patent application No. 98121936.3, filed Nov. 19, 1998, in the European Patent Office; further, Applicants claim the benefit under 35 U.S.C. § 119(e) based on prior-filed, copending provisional application No. 60/110,169, filed Nov. 27, 1998, in the U.S. Patent and Trademark Office; the contents of all of which are relied upon and incorporated herein by reference.

BACKGROUND OF THE INVENTION

1. Field of the Invention

According to a general aspect thereof, the present invention relates to a tyre for vehicles, and in particular to its tread pattern.

2. Description of the Related Art

As is known, a tyre in its most general form comprises a torus-shaped carcass with a central crown and two side walls terminating in a pair of beads for fixing the tyre onto a corresponding mounting rim, a tread band coaxially extending around the crown and a belt structure arranged between the carcass and the tread band.

On its external surface the tread band comprises a raised pattern which, together with the physico-chemical properties of the compound from which it is made, is especially suitable for providing the road-handling properties of the tyre, in particular the tractional power.

Generally the tread pattern is formed by several circumferentially and/or transversely directed grooves which result in voids and solid areas of rubber of different shapes and sizes which are usually called "blocks".

As is known, in the sector of tyre production, a long-standing requirement has been that of ensuring an adequate performance of the tyre, despite the extremely high stresses to which it is subject during use, in particular when it is of the racing type.

Therefore the Applicants have considered the problem of obtaining a tread which is able to optimize the driving performance and grip.

U.S. Pat. No. 4,641,696 describes a tread of the directional type which is suitable for high-power vehicles and for extreme conditions of use. The tread pattern consists of a plurality of blocks which have a substantially rhomboidal shape and are arranged in at least six circumferential rows each other separated by straight circumferential grooves and by slanting transverse grooves.

The Applicants consider that the difficulty of fully satisfying the abovementioned requirement with the type of tread described is essentially related to the difficulty of limiting the mobility of the blocks present on the tread band as the blocks warm up during use.

Hitherto the attempts made in the art to ensure the desired high performance levels of the tyre, based on the design of tread bands provided with grooves having different inclinations and blocks of different shapes, have been unable to achieve fully satisfactory results.

During rolling of the tyre, in fact, the blocks present on the tread band are subjected to a whole series of thermo-mechanical stresses—mainly due to the heating of the compound as a result of friction and to the compressive and shearing forces—which tend to cause flexing and deformation of the blocks. These stresses modify the geometry of the blocks and cause a decline in the performance of the tyre, in particular during the so-called "extreme" driving conditions.

Another problem arises from the presence of straight circumferential grooves on the tread pattern since said latter grooves represent concentrated zones which are subject to deformation under high transverse loads that give rise to a "circumferential hinge" effect. Therefore said grooves modify the tyre footprint when drifting and therefore the grip.

The Applicants have considered in particular the problem of finding a tread pattern which is suitable both for dry and wet grounds.

A tread band, or a portion thereof, is characterized by the value of the "solid/void" ratio which depends on the quantity of rubber which is removed from the tread band owing to the presence of the grooves.

High values of the "solid/void" ratio result in good tractional properties on dry ground, but low road-holding values on wet ground.

Numerous examples of tread patterns which have been especially designed to achieve optimum performance of the tyre on dry and wet ground are already known.

For example, U.S. Pat. No. 4,700,762 describes a tyre provided with a tread pattern formed by a large-width circumferential groove which is located along the equatorial plane and by a plurality of grooves which are extended substantially in the transverse direction on either side of the central groove up to the shoulders of the tyre.

Each transverse groove forms an angle of 45° at the point where it meets with the central groove and then gradually curves until it assumes an orientation substantially perpendicular to the equatorial plane in the end zone of the tread on the shoulder of the tyre.

Therefore, the central groove and the plurality of transverse grooves produce on the sides of the equatorial plane two series of blocks each one extending from the centre to the shoulders of the tyre.

In a further embodiment, the tread pattern has a plurality of circumferential grooves which are parallel to the central groove and which intersect the transverse grooves.

Said further embodiment results in a plurality of circumferential adjacent rows of rhomboidal blocks on each side of the equatorial plane.

The tread pattern is designed so that three to five transverse grooves are present underneath the tyre footprint, each of said grooves being sized in order not to close when the tread comes into contact with the ground; therefore, as a result of said geometric features, the water which is accumulated in the centre of the tyre footprint is conveyed through the transverse grooves towards the shoulders of the tyre and here discharged ensuring driving stability and tractional properties even on wet surfaces.

A tyre marketed by the Applicants under the name "P ZERO C" and comprising a tread pattern formed by two distinct parts which are each other circumferentially located alongside, i.e. an external part and an internal part with respect to the mounting position of the tyre on the vehicle, is known too.

The external part of the tread comprises, from the central zone towards the corresponding end, a continuous longitudinal rib which is defined between two circumferential grooves and comprises on both sides substantially axial incisions partially extending in the direction of the width of the rib. In an axially external position, the abovementioned rib has, arranged alongside it, another shoulder-type rib which is substantially smooth, except for an ordered series of small blind incisions extending circumferentially in succession on the internal side.

Said first part of the pattern has a very high solid/void ratio so as to ensure good tractional properties on dry ground.

The second part of the tread, i.e. the internal part, comprises, from the centre towards the corresponding end, a longitudinal rib defined between two central grooves and cut by transverse grooves which are directed substantially in the form of a herring-bone pattern and, in a more axially external position, it comprises a row of substantially rhomboidal shoulder blocks.

Said second part of the pattern has a solid/void ratio which is lower than that of the first part so as to provide good tractional properties also on wet ground.

It should also be pointed out that in the market there is a great demand for tyres with optimum performance features both on dry and on wet ground in order to satisfy a certain category of clients who own powerful cars in particular for use on racing tracks or in any case for racing purposes.

SUMMARY OF THE INVENTION

The Applicants, in the light of the state of the art described above, have set themselves the task of realizing a tread provided with a pattern which is suitable both for dry and wet grounds and having features in order to ensure driving stability not only to cars intended for ordinary use but also to powerful cars used for racing purposes and the like.

The Applicants have thought to specialize the tread pattern by using a system of grooves intended for a specific purpose (in place of the known multi-purpose grooves), some of which are specifically suitable for providing an optimum performance on wet ground, while others, different from the first ones, are suitable for ensuring an optimum performance on dry ground. The Applicants have realized that it was possible to solve the problem by using any combination of grooves on condition that they were distributed in such a way that they did not intersect each other, avoiding also the formation of circumferential grooves, all of which with the aim of eliminating isolated blocks and zones with concentrated compliance (circumferential hinges), fact which causes a certain mobility underneath the tyre footprint and consequent unstable driving conditions.

Therefore it has been thought that a convenient solution could consist in an arrangement of grooves such that it were possible to pass from one shoulder to the opposite shoulder of the tyre without passing through one or more grooves.

It has also been found that the performance of the tyre on wet ground could be improved by using one or also several series of "blind" grooves, the longitudinal extension of which were greater than the length of the tyre footprint inflated to the nominal operating pressure and subjected to the nominal load, under static conditions.

Hereinbelow the wording "blind" grooves indicates that said grooves are cavities which are surrounded by continuous walls and hence without entrance or exit paths.

It has also been found to be convenient to distribute the blind grooves along a central portion of the tyre footprint in which there is the greater risk of water stagnation without thereby excluding further blind grooves with an extension greater than the length of the tyre footprint in other portions of the tread.

In practice it has been found that the water collected by the blind grooves underneath the tyre footprint could flow towards the ends located outside the tyre footprint, preventing problems of aquaplaning.

According to a first aspect thereof, therefore the invention relates to a tyre for vehicle wheels which is provided with a tread pattern having solid areas extending in a continuous manner between two shoulders which are axially opposite with respect to the equatorial plane of the tyre.

The pattern comprises two lateral rows of grooves and at least a third central row formed by a plurality of grooves arranged between said lateral rows, the grooves of each row being circumferentially spaced from one another, and the grooves of the lateral rows axially extending from the corresponding shoulder as far as a predetermined distance from the equatorial plane.

The main features of the tread pattern are as follows:

all the grooves of the three rows are separate from one another so as to produce a pattern with no communicating paths in the thickness of the tread which connect together said grooves;

the ends of the grooves of the third row are far from the shoulders of the tyre;

the maximum distance between two points of each groove of the third row, measured according to the circumferential direction, is greater than the length of the tyre footprint measured at the nominal inflation pressure and subjected to the nominal load under static conditions.

The greater dimension of each groove of the central row with respect to the length of the tyre footprint results in the drainage of the water underneath the tyre footprint.

Conveniently, the maximum distance between said two points of each groove of the third row is comprised between 1.01 and 2.5 times the length of the tyre footprint.

In a preferred embodiment the tyre comprises grooves of the third row which have a width, measured over the surface of the tread, ranging between 6 and 15 mm.

According to a first variation of embodiment, the tyre comprises an additional fourth row of grooves which are spaced from one another circumferentially and separate from those of the other rows, the grooves of said fourth row starting from a shoulder, between two adjacent grooves of a lateral row, and terminating between two adjacent grooves of the central row.

Said embodiment is particularly suitable for an "asymmetrical directional" tyre, where "asymmetrical" is intended as a tread pattern having a portion which is different from the axially opposite portion, with respect to the equatorial plane of the tyre, and "directional" is intended as a tread pattern which identifies a particularly preferred direction of rotation of the tyre.

Preferably in said tyre the grooves of a first lateral row together with the grooves of the third row and the grooves of the second lateral row together with the grooves of the fourth row are respectively aligned along a first and a second trajectory each other circumferentially alternated, said trajectories having a substantially undulating shape with the peaks of the undulations being aligned along circumferential planes parallel to the equatorial plane, said first trajectory being interrupted between the grooves of the first and the third row and said second trajectory being interrupted between the grooves of the fourth and the second lateral row.

In a further variation of embodiment, the tyre is characterized in that the grooves of said fourth row are symmetrical, relative to the equatorial plane, with those of said third row.

Conveniently said tyre is of the directional type and is characterized in that the axially most internal peaks of the substantially undulating trajectories comprising respectively said third and fourth rows of grooves are aligned on the equatorial plane.

According to a second aspect thereof, the invention relates to a tyre characterized in that it comprises means for acoustically signalling the value of the inflation pressure when it is lower than a predefined limit, said means consisting in the fact that the dimension, in the direction of travel, of one or more grooves of said central row is greater than the length of the tyre footprint, measured at the nominal inflation pressure and subjected to the nominal load, under static conditions. In this way, under pressure values lower than said predefined limit, the tyre footprint assumes dimensions which are at least equal to those of said grooves. This feature, during the rolling of the tyre, firstly causes the retention of the air in the grooves, during the contact with the ground, and then the immediate expulsion of the air outside the tyre footprint, with consequent generation of a fairly loud noise.

According to a further aspect thereof, the invention relates to a method for checking the correct value of the air pressure inside of a tyre for vehicle wheels provided with a tread pattern axially extending in a continuous manner between two shoulders which are axially opposite with respect to the equatorial plane of the tyre.

The method comprises the steps of:
a) forming in the tread pattern at least one row of grooves which are circumferentially spaced from one other;
b) assigning to at least some of the successive grooves of said row a dimension in the direction of travel which is greater than the dimension of the tyre footprint in the same direction, measured on the tyre at the nominal inflation pressure and subjected to the nominal load, under static conditions;
c) checking, under static load conditions with the inflation pressure less than the predefined value, whether the dimensions (length, width and depth) of the grooves are such as to allow the enclosure of the air trapped underneath the tyre footprint and the expulsion thereof outside the tyre footprint with the generation of noise;
d) modifying the dimensions and the number of said grooves until an acoustic signal indicating a lower air pressure inside the tyre is produced.

According to a fourth aspect thereof, the invention relates to an acoustic signalling device for vehicle wheels provided with a tread pattern comprising several groups of grooves including at least one axially internal row of grooves circumferentially spaced from each other, characterized in that it comprises one or more grooves of said internal row which, in the direction of rolling of the tyre, have a dimension which is greater than the dimension of the tyre footprint measured on the tyre at the nominal inflation pressure subjected to the nominal load under static conditions and a dimension smaller than or equal to the dimension of the tyre footprint measured on the tyre at an inflation pressure which is lower than a predefined limit subjected to the nominal load, under static conditions.

According to a fifth aspect thereof, the invention relates to a tread band for vehicle tyres, provided with a tread pattern defined between two shoulders which are each other axially opposite with respect to the equatorial plane of the tyre and comprising: at least a first and a second circumferential series of cavities longitudinally extending in the direction of forward travel of the tyre, where said first and second circumferential series of cavities define an essentially continuous portion of tread band axially extending between the two shoulders and are such as to produce a directional pattern characterized in that at least the ends of the cavities of said first circumferential series are far from said shoulders.

According to a different aspect thereof, the invention relates to a method for indicating the reduction in the inflation pressure of a tyre provided with a tread pattern, characterized in that it has at least one element of said tread pattern which is able to vary the noise level of the tread upon variation of the inflation pressure of said tyre.

According to the invention, the Applicants have found in particular that the abovementioned essentially continuous portions of tread band, which extend alternately from opposite shoulder zones towards the equatorial plane of the tyre form a kind of "network" or "matrix" of portions of elastomeric material which are each other interlocked and substantially devoid of longitudinal hinge elements.

Moreover said essentially continuous portions of tread band form a corresponding number of sets of "struts" which are suitable for transmitting, along their axis and towards the rear side of the essentially continuous and axially opposite portions, the stresses imparted to them during the rolling of the tyre.

The structural rigidity due to the interlocking of the essentially continuous and axially opposite portions of the tread band allows said portions to absorb all those thermomechanical stresses imparted to them during the rolling of the tyre without flexing or being excessively deformed.

Owing to said reduction in the mobility of the different tread band portions, a drastic reduction in the thermomechanical degradation phenomena of the elastomeric matrix of the tread band has been noted, even in the presence of very high stresses.

BRIEF DESCRIPTION OF THE DRAWINGS

Further features and advantages will emerge more clearly from the description which follows of some preferred forms of embodiment of a tyre according to the invention, provided by way of a non-limiting example, with reference to the accompanying drawings, in which.

DETAILED DESCRIPTION OF THE PREFERRED EMBODIMENTS

Figure 1:
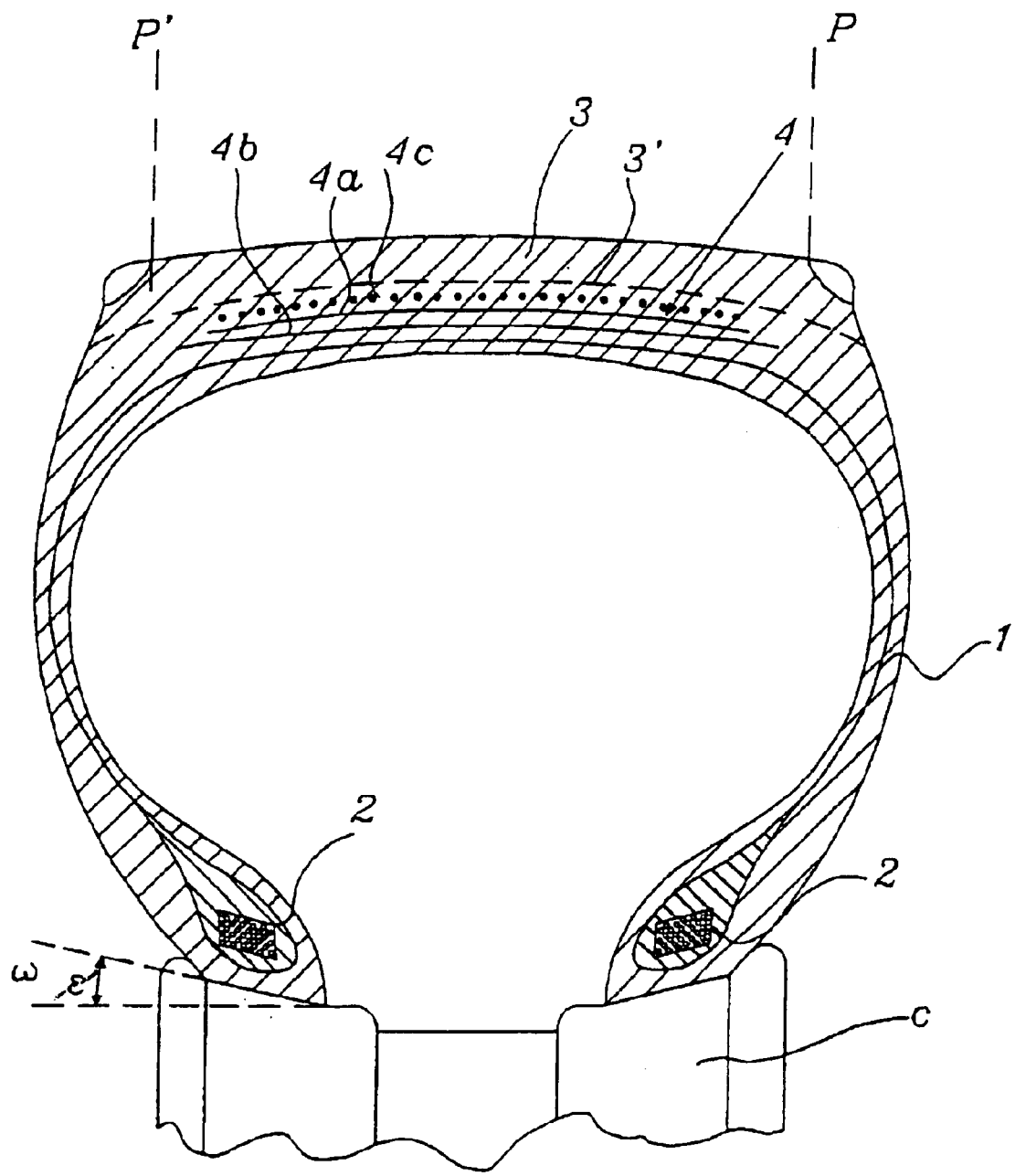
FIG. 1 shows a cross-sectional view of a tyre according to the invention.

FIG. 1 shows a tyre for vehicles according to the invention, in particular a tyre for motor vehicles.

The tyre comprises a carcass 1 toroidally shaped in the form of a ring preferably consisting of at least one reinforcing ply which is reinforced with cords lying in radial planes, i.e. containing the axis of rotation of the tyre, and having its ends fixed to two annular metal cores 2—usually known as bead cores—constituting the reinforcement of the beads, i.e. the radially internal ends of said tyre, which have the function of allowing the assembly of the tyre with its corresponding mounting rim: the abovementioned tyre is mounted on a rim C, the bases of which supporting the beads of the tyre conically diverging outwards at an angle ω having a predetermined value, in particular equal to 5° for car tyres.

On said carcass a thick band 3 of elastomeric material, i.e. the tread band, is positioned, inside of which a raised pattern for contacting the road is formed, furthermore said pattern ensuring that the abovementioned tyre has properties of tractional power, low noise, draining capacity and uniformity of wear.

The tread band (FIG. 3) is axially defined between the two shoulders ends P and P' which are axially opposite relative to the equatorial plane X—X and has a thickness of predetermined value defined between the external surface intended to contact the ground and an internal surface in contact with a thin sheet 3' of rubber compound which has the function of determining the adhesion at room temperature between the compound of the tread band and the underlying components of the tyre.

In this connection, it should be noted that between carcass 1 and thin sheet 3' of tread band 3 is situated an annular reinforcing structure 4, usually known as a belt structure, that is circumferentially unextendable. Annular reinforcing structure 4 comprises at least two radially-superimposed layers (4a, 4b) of rubberized fabric provided with reinforcing cords that are parallel to each other within each layer and that cross the cords of the adjacent layer, which are preferably symmetrically incline with respect to the equatorial plane of the tyre. Annular reinforcing structure 4 preferably also comprises a third layer 4c of nylon cords that are circumferentially wound in a radially-external position. This structure, as is well known, the specific function of counteracting the forces acting inside the tyre during use and associated with the inflation pressure and the centrifugal force, as well as ensuring the necessary handling properties, in particular during travel around bends.

The tread band comprises a plurality of grooves arranged accoring to several circumferential rows which are adjacent to each other, at least one of which, the axially internal row, comprises blind grooves S, the ends of which are located at a distance from the end edges P–P' of the shoulders and the dimension of which in the circumferential direction has an extension greater than that of the tyre footprint measured in the region of said groove.

For the purposes of the present invention, "tyre footprint" is intended as the tread portion in contact with the ground under predefined conditions with regard to the load, pressure and geometry of the suspension.

Figure 2:
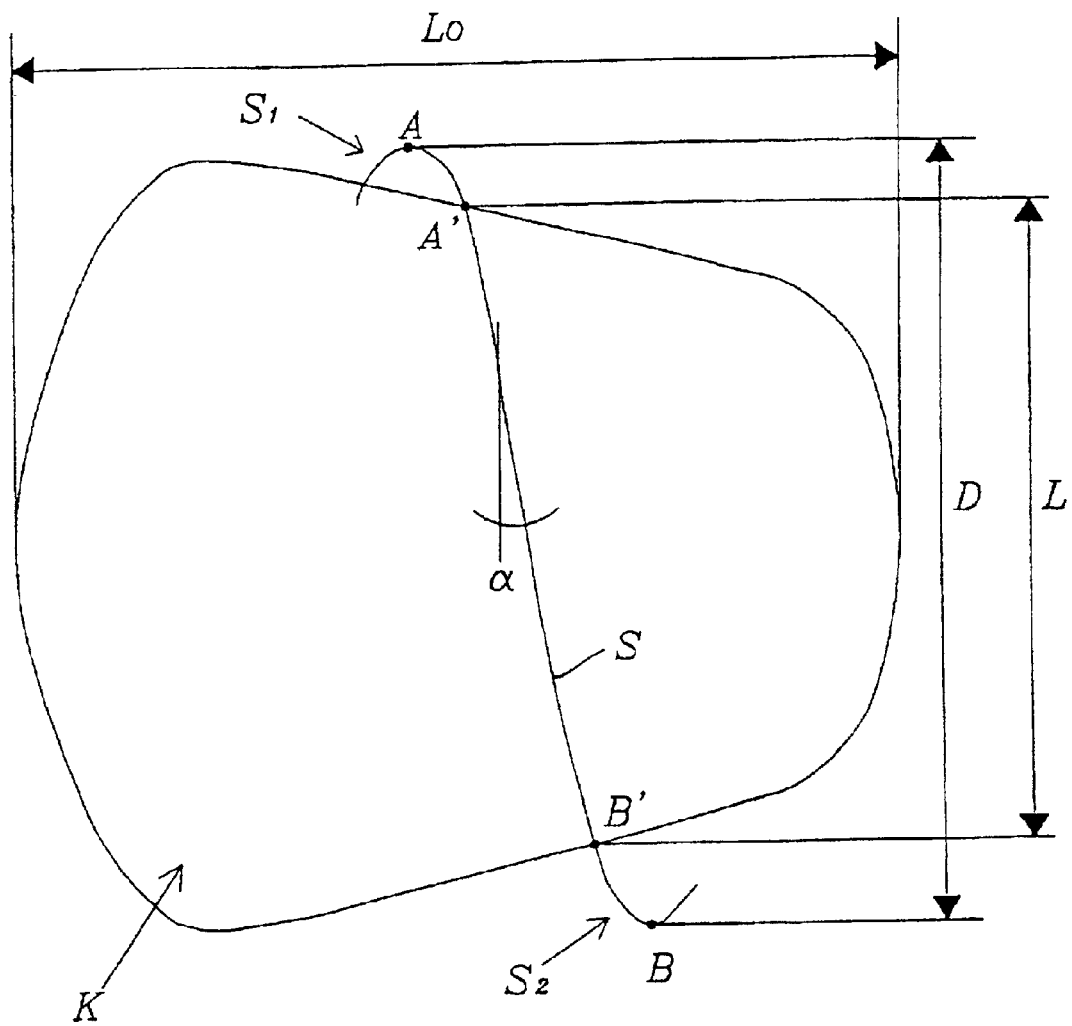
FIG. 2 shows a plan view of a particular type of groove, according to the present invention, in relation to the tyre footprint.

For a better understanding of the invention it has been assumed that the tyre footprint according to FIG. 1—said tyre being mounted on the vehicle with a camber angle of 2°, inflated to the nominal operating pressure and subjected to the nominal operating load under static conditions, i.e. with the tyre at a standstill—corresponds to the area K of FIG. 2 defined by a width "Lo" parallel to the rotation axis of the tyre.

The tyre footprint has substantially the shape of a trapezium with the larger base towards the inner side of the motor vehicle and the smaller side towards the outer side.

Still with reference to FIG. 2, a preferred embodiment of one of the said grooves S of an internal row is shown, the main feature of said groove being that of having an extension greater than that of the tyre footprint.

The length "L" of the tyre footprint must be measured between the points A' and B' of intersection of the curve S with the sides of the tyre footprint, owing to the variation, in the axial direction, of the circumferential dimension of the tyre footprint.

A curve S located on the tread in a position close to the inner side of the motor vehicle must have a length greater than that which a curve S may have in the vicinity of the outer side of the motor vehicle.

In fact, as can be clearly seen in FIG. 2, the maximum distance "D" between two points A, B of the groove S measured in the circumferential direction is greater than the length L of tyre footprint K, in the zone where curve S has been positioned, so as to advantageously allow the flowing out of the water contained in the closed portion of the groove (since it is in contact with the ground) from free ends A, B.

In a preferred embodiment, groove S is defined by a substantially straight section, oriented at an inclination angle α with respect to the equatorial plane, and by two end portions S1, S2 shaped in the form of two curved arcs each other having opposite curvatures as can be clearly seen in FIG. 2. Angle α is comprised between 0° and 90°, being preferably limited from 0° to 40° and even more preferably equal to about 20°.

Obviously, groove S could have different configurations, for example it could be shaped as a single straight section or could deviate from the straight pattern and become curved, for example with a first curved loop pointing in one direction and with a second loop pointing in the opposite direction, or groove S could also be oriented along a straight section directed according to the equatorial plane with or without the end portions having opposite curvatures to one another.

Preferably groove S has the shape of an S (in its normal or inverted position) such that a pair of said grooves may produce inside of the matrix of the pattern a continuous portion of tread band, with an undulating shape, as described above. Similarly, the "apex" of groove S is such as to produce a section which has a particularly large number of cavities, i.e. precisely where there is the greatest stagnation of water.

The minimum value of the maximum extension in the circumferential direction (length) or in the axial direction (width) of groove S must be such that groove S has at least a portion thereof outside the tyre footprint, so as to be able to drain the water under said tyre footprint.

For this purpose, said maximum extension is greater than the dimension of the tyre footprint in the same axial or circumferential direction where the curve S is located and is preferably between 1.01 and 2.5 times said dimension L.

The abovementioned maximum distance D between two points A, B of a groove S is more preferably between 1.2 and 1.5 times the length of the tyre footprint L.

However, it is possible to increase said distance D up to a maximum of 50% of the circumference of the tyre. In this way it is possible to have only two grooves S for the entire tyre.

In a first preferred embodiment of the tyre according to FIG. 1, the tread pattern comprises (FIG. 3) two lateral rows of grooves 5, 6, i.e. a first and a second row respectively, and at least a third central row formed by a plurality of grooves 7, each of which is substantially similar to groove S of FIG. 2.

Preferably grooves 5, 6 of the lateral rows are circumferentially spaced from one another and axially extend from shoulders P, P' up to a predetermined distance from equatorial plane X—X, which may also vary from groove to groove.

In particular, if the axial width between the ends of shoulders P–P' is defined by "W", it has been found to be convenient to terminate the axially more internal ends of grooves 5 and 6 at a distance from the equatorial plane, respectively 500 and 600, ranging between 0.1W and 0.4W.

Preferably, grooves 7 extend on both sides of equatorial plane X—X and, even more preferably, each groove 7 has an axial distance 800 from first shoulder P which is comprised between 0.2W and 0.5W and an axial distance 900 from second shoulder P' which is comprised between 0.1W and 0.4W.

By way of example, in a tyre of size 265/35-R-18, distance W, in planewise extension, is equal to 305 mm, the ends of grooves 5 are located at 70 mm from the equatorial plane, the ends of grooves 6 are located at 40 mm from the equatorial plane, the ends of groove 7 are located at 70 mm from shoulder P' and 105 mm from the shoulder P. The tyre footprint of such a tyre inflated to a pressure of 3 bar, with a vertical load of 400 kg, has an area of about 150 mm$^2$, a width of 197 mm and a length L of 100 mm, the maximum dimension of groove 7 is equal to 130 mm.

Preferably, the grooves of central row 7 are circumferentially spaced from one another and are alternated with those of lateral row 6.

Figure 3:
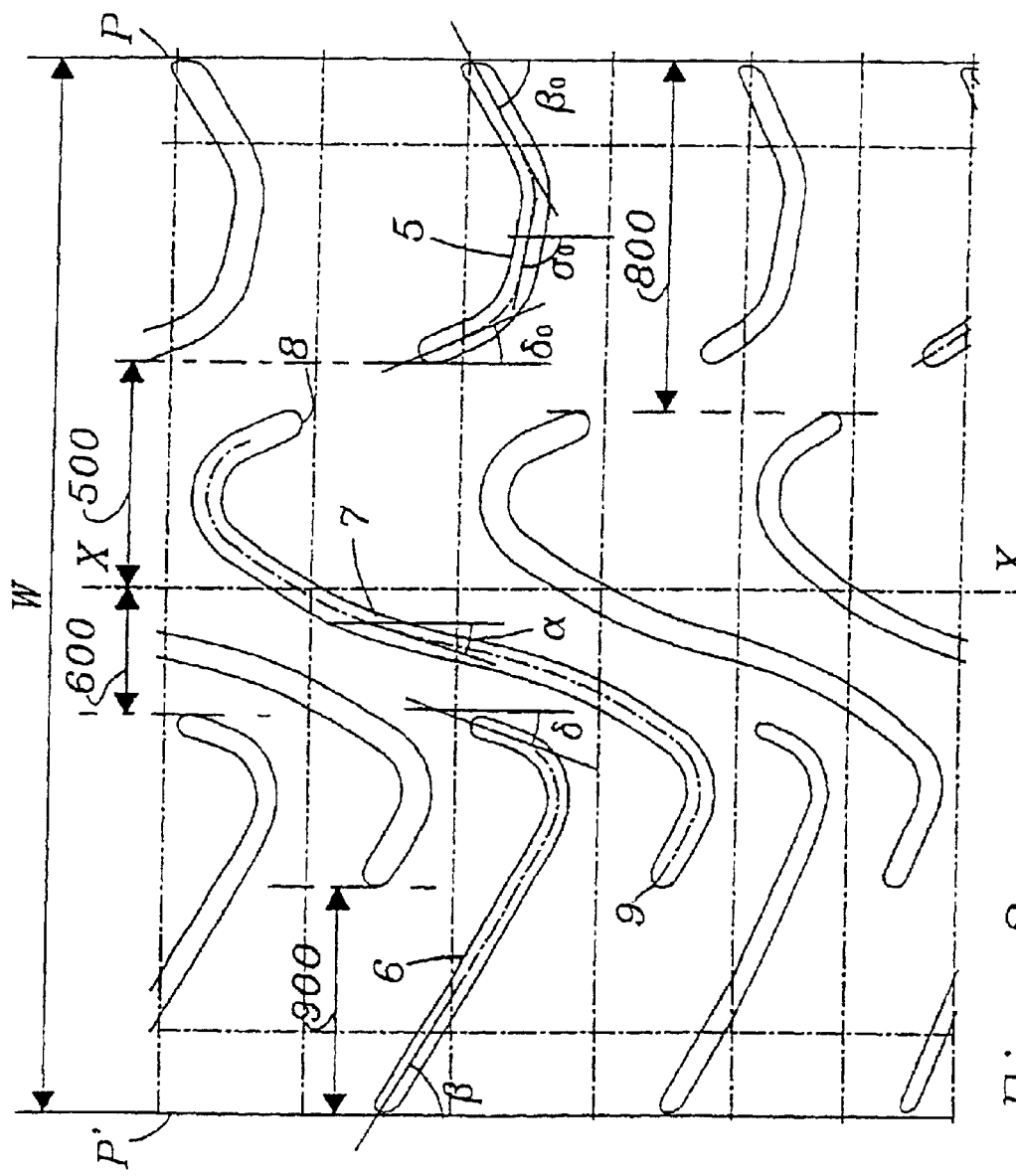
FIG. 3 shows a plan view of the tread band of a first embodiment of the tyre according to the invention.

Lateral grooves 5, 6 axially extend inwards but preferably not in the axial direction: FIG. 3 shows some configurations which diverge at least partly from the axial direction so as to assume shapes which are substantially curved in a direction transverse to the circumferential direction.

In accordance with a more specific embodiment, the lateral grooves 5 have a different shape from the lateral grooves 6 and more precisely:

lateral grooves 6 start from the second shoulder P' with a first portion that is inclined with respect to the straight profile of said shoulder at an angle "β" terminating in a second portion inclined at an angle "δ" in the opposite direction with respect to "β";

lateral grooves 5 start from the first shoulder P with a first portion that is inclined with respect to the straight profile of said shoulder at an angle "$β_0$", continue with a second portion having an inclination angle "$σ_0$", again with respect to the straight shoulder profile, and then terminate with a third portion inclined at an angle "$δ_0$" in the opposite direction with respect to "$β_0$".

Preferably grooves 5 and 6 are formed with the following values for the abovementioned inclination angles:

"β" is comprised between 30° and 50°, more preferably being equal to about 45°;

"δ" is comprised between 0° and 40°, more preferably being equal to about 20°;

"$β_o$" is comprised between 0° and 60°, more preferably being equal to about 45°;

"$δ_o$" is comprised between 0° and 40°, more preferably being equal to about 20°;

"$σ_o$" is comrprised between 80° and 140°, more preferably being equal to about 120°.

Preferably the central portion of grooves 7 is inclined at an angle α comprised between 0° and 90°, preferably being limited from 0° to 40° and even more preferably being equal to about 20°.

Furthermore, even more preferably, the end sections of grooves 5 of the first lateral row are aligned in the direction of adjacent end sections 8 of grooves 7, while end sections 9 of abovementioned grooves 7 are arranged in between each pair of end sections of grooves 6 of the second lateral row.

Advantageously the feature of asymmetry between the tread portions on opposite sides of the equatorial plane results in a discontinuity in the gripping zones of the tread inside of the tyre footprint, fact which improves its low-noise properties.

Moreover, as shown in FIG. 3, the invention envisages to realize all the grooves 5, 6, 7 of the lateral rows and of the central row so as to produce a pattern which has no intercommunicating paths between said grooves; advantageously the absence of said mutual intersections, as for example could arise from continuous circumferential grooves, prevents the formation of isolated blocks with a high degree of mobility.

In a preferred different embodiment of the tyre, the tread pattern comprises (FIG. 4) an additional fourth row of grooves 10 the main feature of which is to be extended from a substantially central zone until they emerge in the vicinity of one of two shoulders P, P', preferably in the vicinity of shoulder P, which will be defined as "car side shoulder".

More particularly, grooves 10 have a first end section 11 arranged between two grooves 7 and a second end section 12 arranged between two grooves 5, preferably with end 12 emerging on shoulder P.

According to a different embodiment, ends 11 of grooves 10 are aligned on the equatorial plane; in other variations, ends 11 are located at a predefined distance from equatorial plane X—X, on the same side of shoulder P or on the side of shoulder P' or alternately on both sides of the equatorial plane.

Figure 4:
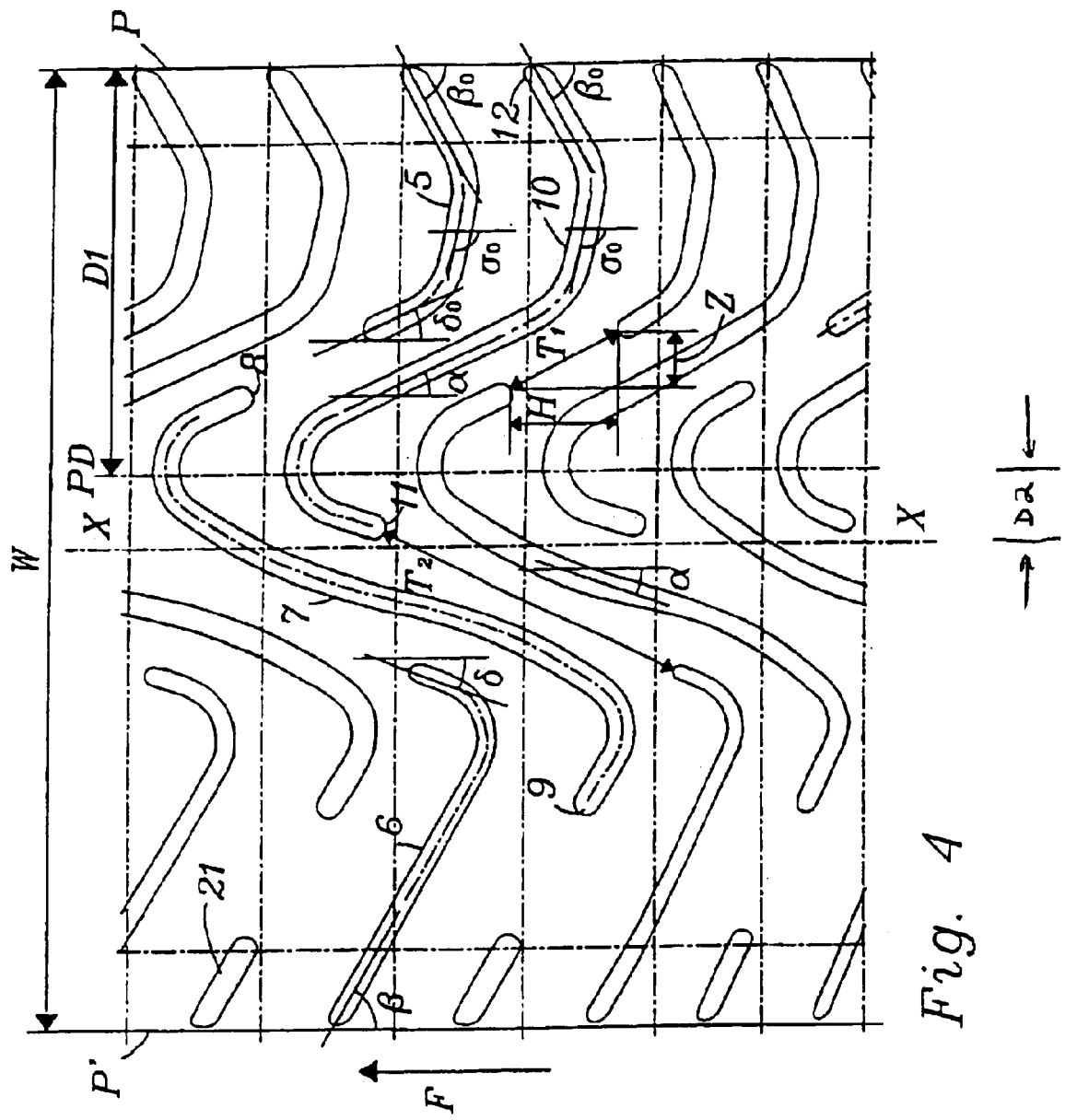
FIG. 4 shows a plan view of the tread band of a second embodiment of the tyre according to the invention.

In the example of embodiment according to FIG. 4, grooves 10 comprise, starting from shoulder P, a first portion inclined at an angle "$β_o$" with respect to the straight shoulder profile, a second portion with an inclination angle "$σ_o$", a third portion which is substantially axial and a final portion which is substantially symmetrical, but circumferentially offset with respect to the central portion of grooves 7. Preferably, the distance between ends 11 of grooves 10 and the equatorial plane is constant and/or comprised between 0.01W and 0.2W.

Advantageously, whatever the form of embodiment of the grooves of the fourth row is, a synergic effect, due to the simultaneous presence of said grooves 10 together with blind grooves 7 of the internal row, is obtained for the purposes of the water drainage under the tyre footprint.

According to another form of embodiment, the tread pattern comprises an additional row of lateral grooves 21, each one being formed by a cavity with a length from 0.05W to 0.2W which extends from shoulder P' at an angle $β_o$.

Lateral grooves 21 are preferably intercalated with those of lateral row 6.

Advantageously, said grooves 21, which are substantially located in external shoulder zone P' of the tyre, reduce the noisiness produced by said shoulder, as well as the grip performance on wet surfaces.

The configuration of the tread pattern according to FIG. 4 is characterized in particular by the fact that lateral grooves 5 of the first lateral row together with grooves 7 of the third row, as well as grooves 10 of the fourth row together with grooves 6 of the second row, are respectively aligned along a first and a second trajectory circumferentially alternating with one another.

In addition to said feature, both trajectories have a substantially undulating pattern with the adjacent peaks of the undulations formed by grooves 7 and 10 which are aligned on a circumferential plane PD parallel to the equatorial plane.

Distance D1 of plane PD from shoulder P (car side) is comprised between 30% and 50% of total width W of the tread band, and more preferably is equal to about 40%.

Consequently, the value of the ratio between distance D2 of circumferential plane PD from the equatorial plane and width W of the tread is comprised between 0 and 0.20.

Motor cars are characterized by particular values of the inclination angles of the equatorial plane of the wheels with respect to their longitudinal center plane, which is perpendicular to the ground, said values being determined by the vehicle manufacturers and, having the purpose of achieving the maximum performance. Said angles include the camber angle which is the angle comprised between the abovementioned plane perpendicular to the ground and the equatorial plane of the wheel, measured in degrees on the vertical plane. With a slightly negative camber angle, for example comprised between 1° and 3°, in particular equal to 2°, normally used on sports cars, the tyre footprint is not exactly symmetrical with respect to the equatorial plane of the tyre, but has substantially the shape of a trapezium with the larger base towards the inner side of the motor vehicle and the smaller side towards the outer side.

Therefore the area in which the most water drainage is required is displaced towards the inner side of the motor vehicle, with respect to the equatorial plane. For this reason, distance D1 has been chosen so that the peaks of grooves 7 and 10 are positioned closer to the vehicle relative to the equatorial plane of the tyre, so as to achieve a better water drainage from underneath the tyre footprint.

Moreover, according to a further aspect of the invention, each of the undulating trajectories comprises grooves of different rows, with the feature that the different grooves on each trajectory are independent of one another.

In fact, as shown in FIG. 4, the first trajectory has an interruption T1 between the grooves 5, 7 of first and the third row, while the second trajectory has an interruption T2 between grooves 10, 6 of the fourth and the second row.

Advantageously, said embodiment allows to pass from any point of a shoulder to any point on the other shoulder, passing through the spaces between pairs of undulating trajectories without passing through any groove.

Therefore, transversely continuous blocks of rubber extend between the pairs of trajectories, said blocks being highly resistant to the transverse deformations resulting from the contact between the tread and the ground during travel.

Moreover, said blocks of rubber are connected together by rubber bridge-pieces along the extended interruptions T1 and T2 between the grooves of the first and second undulating trajectories, with the favourable result of providing a further increase in the rigidity, particularly in the circumferential direction, simultaneously ensuring, with reference to that already mentioned above, optimum properties in terms of water drainage which is accumulated underneath the tyre footprint.

Conveniently, in order to obtain the advantages of maximum resistance to the flexural strains, the interruptions T1 and T2 between the grooves aligned on the trajectory may have the following dimensions, with reference, for the sake of convenience, to the example of FIG. 4: axial extension Z comprised between 3% and 25% of W, circumferential extension H comprised between 10% and 50% of W.

Preferably the grooves are arranged so as to be asymmetrical with respect to one another, relative to equatorial plane X—X, and form an arrow-shaped pattern, thus giving rise to a directional tyre. The direction of travel will be indicated by F.

In particular, FIG. 4 shows a tyre mounted on the motor vehicle in the front left-hand position.

The tread pattern illustrated above is an asymmetrical/directional pattern which can be used on any size of tyre, but preferably on low-profile tyres with a very large width W of the tread band, for example greater than 205 mm.

In a different preferred embodiment (FIG. 5) the tyre is provided with a tread band again formed by two lateral rows of grooves in the zones close to the shoulders and by a third, internal, central row, again formed by a plurality of blind grooves, with the variation, compared to that described above, of having a further central internal row (fifth row in the order of description) which comprises a plurality of grooves 20 which are substantially a mirror-image of those of the third row, but are preferably symmetrically arranged with respect to the equatorial plane and circumferentially arranged alternated with those of the third row.

The abovementioned grooves may have different configurations, for example those of the lateral first and second rows may be shaped as already shown in FIG. 4.

Figure 5:
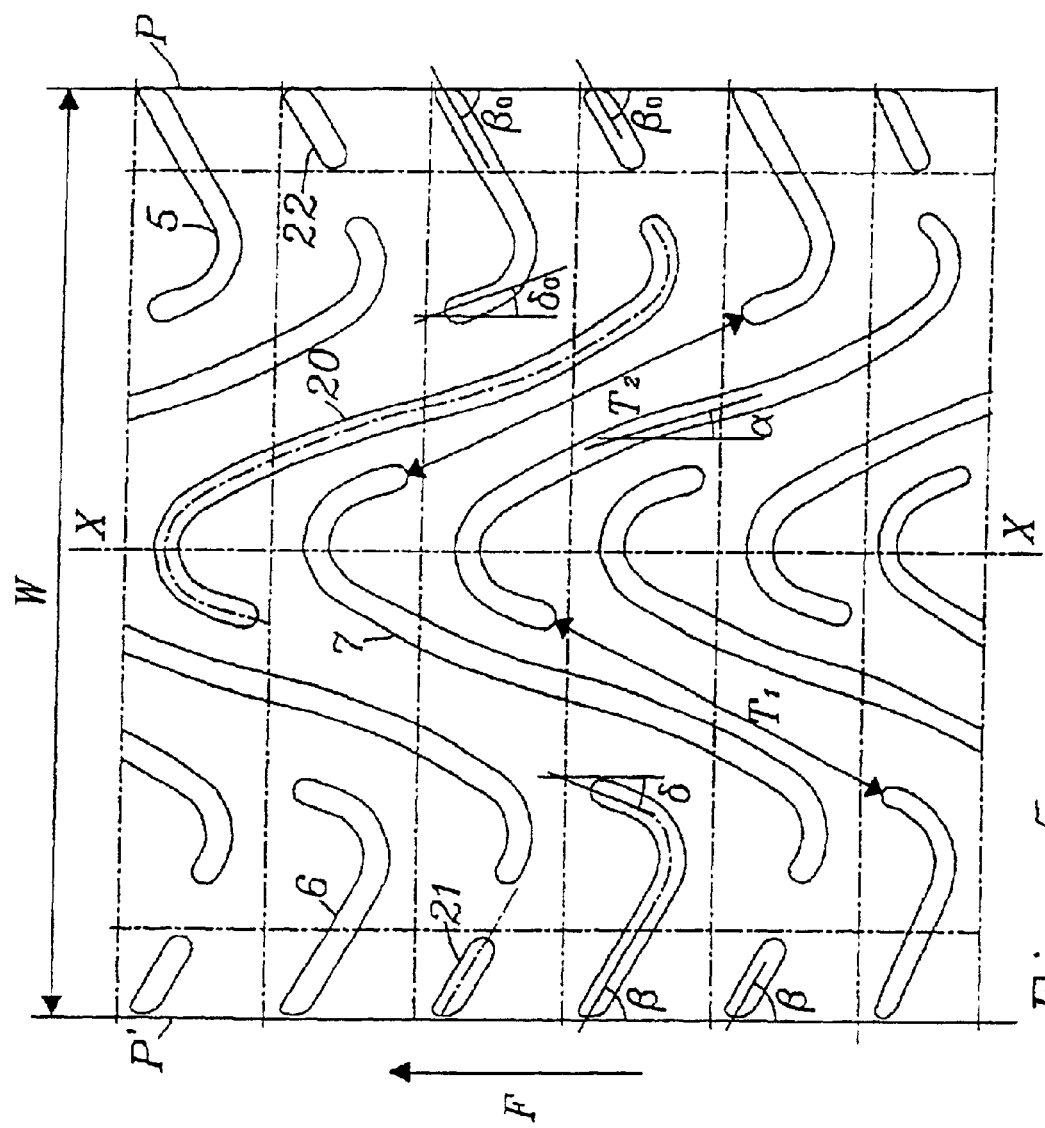
FIG. 5 shows a plan view of the tread band of a third embodiment of the tyre according to the invention.

In the preferred embodiment shown in FIG. 5, the two lateral rows comprise grooves 5, 6 which are shaped as curves having their concavity in the direction of travel indicated by arrow "F", while grooves 7, 20 of the third and fifth row are substantially identical to those already shown in FIG. 4.

Preferably grooves 20 are inclined at an angle α comprised between 0° and 90, preferably comprised between 0° and 40° and even more preferably equal to about 20°.

In particular the tread band has grooves which are arranged astride the equatorial plane, being substantially symmetrical, but each other circumferentially staggered.

As shown in FIG. 5, the opposite grooves of the third and fifth rows have peaks which are arranged on the equatorial plane and form an arrow-shaped pattern in the direction of travel F; preferably, the axially external end sections of the grooves of the third and fifth rows are arranged between two consecutive grooves of the adjacent lateral rows.

The tread pattern of the preferred symmetrical directional embodiment comprises the grooves of the third and fifth rows arranged in a central zone with an axial width comprised between 30% and 60% of axial width W of the tread band and the grooves of each lateral row arranged in a zone with a width comprised between 10% and 40% of W.

In some embodiments the grooves of the first, second, third and fifth rows have values for the width, depth and inclination of the walls forming the cavities of each groove, as well as values for the inclination angles "β", "δ", "$β_o$", "$δ_o$", as already indicated with reference to FIG. 4.

According to a further form of embodiment, the tread pattern comprises two additional rows of lateral grooves 21 and 22, formed by a preferably straight portion with a length comprised between 0.05W and 0.2W, starting respectively from shoulder P' and shoulder P, with an inclination angle "β" and "$β_o$"

Lateral grooves 21 and 22 are preferably intercalated with the rows of grooves 6 and 5.

Advantageously, the typical circumferential arrangement intercalated between the tread grooves astride the equatorial plane results in a discontinuity in the impact edges of the tread pattern along the tyre footprint, fact which improves the low-noise features of the tyre.

Moreover, as shown in FIG. 5, in accordance with the invention, all grooves 5, 6, 7, 20 are formed so as to produce a pattern which does not have any intercommunicating paths between said grooves; advantageously the absence of mutual intersections, as for example could arise from the presence of circumferential grooves, prevents the formation of isolated blocks with a high degree of mobility.

Advantageously, for the purposes of water drainage underneath the tyre footprint, a synergic effect is obtained which is due to the simultaneous presence of a pair of blind grooves 7 and 20.

Even in this case, the configuration of the tread pattern according to FIG. 5 is characterized in that lateral grooves 5 of the first lateral row together with grooves 7 of the third row as well as grooves 20 of the fifth row together with the grooves 6 of the second row are respectively aligned along a first and a second trajectory, which are each other circumferentially alternated with one another.

In addition to said feature, both the trajectories have an undulating, substantially sinusoidal pattern, with the peaks of the undulations being preferably aligned along planes parallel to the equatorial plane, with the peaks in an axially internal position substantially aligned on said equatorial plane.

Moreover, still in accordance with the invention, each of the two trajectories comprises grooves of several different rows, with the feature that the different grooves of each trajectory are independent of one another.

In fact, as shown in FIG. 5, the first trajectory has an interruption T1 between grooves 20 and 6 of the fifth and the second rows, while the second trajectory has an interruption T2 between grooves 5 and 7 of the first and the third rows.

Advantageously, said embodiment allows to pass from any point of a shoulder to any point on the other shoulder, passing through the spaces between pairs of undulating trajectories without passing through any groove.

Therefore, transversely continuous blocks made of rubber extend between the pairs of trajectories, said blocks being highly resistant to the transverse deformations resulting from the contact between the tread and the ground during travel.

Moreover, said blocks of rubber are each other connected by rubber bridge-pieces along the extended interruptions T1 and T2 between the grooves of the first and second undulating trajectories, with the favourable result of providing a further increase in the rigidity, particularly in the circumferential direction, simultaneously ensuring, with reference to that already mentioned previously, optimum properties in terms of water drainage which is accumulated underneath the tyre footprint.

The described arrangement of the grooves forms an arrow-shaped pattern which results in a directional tyre. The direction of travel is that indicated by F.

The tread pattern defined above may be regarded as symmetrical/directional and may be used on any size of tyre, preferably on tyres without a high chords, for example with a width W of the tread band comprised between 185 mm and 245 mm.

Moreover, although the grooves of the different rows comprise different shapes and dimensions which are suitable for achieving the objects of the invention, those which result in the most significant advantages are indicated hereinbelow.

Figure 6:
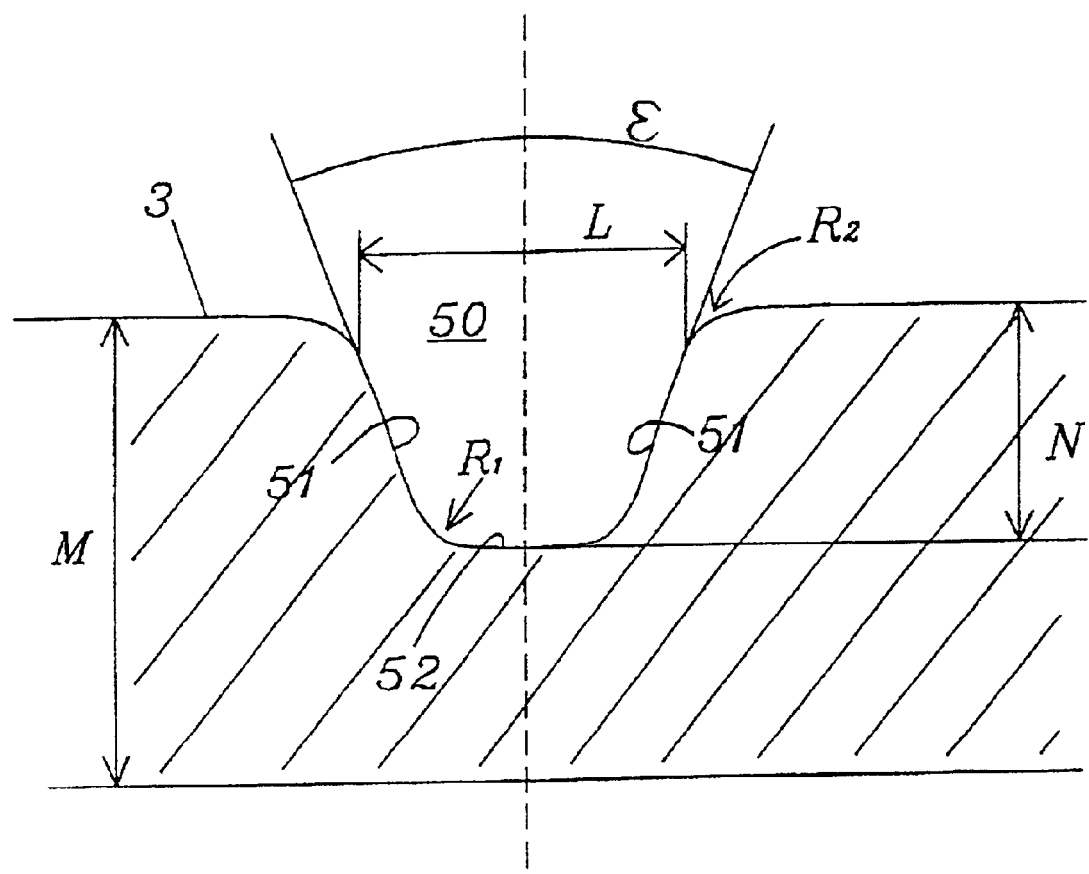
FIG. 6 shows, on enlarged scale, a cross-sectional view of the grooves of the tyre according to the invention.

FIG. 6 shows an enlarged cross-section of the tyre grooves according to the invention. Groove 50 is defined between two side walls 51, diverging towards the external surface of the tread band 3 at an angle "ε" comprised between 6° and 24°, and preferably equal to about 16°. Side walls 51 are connected to bottom 52 of groove 50 and to the external surface by means of circular arcs "$R_1$" and "$R_2$", which are respectively radially internal and external and have a radius of curvature ranging from 2 to 5 mm.

In a preferred embodiment, it is envisaged that the value of radius "$R_1$" for the radially-internal circular arcs is equal to 2.7 mm, while the value of the radius of curvature "$R_2$" of the radially-external arcs is equal to 4 mm.

Moreover, groove 50 has a width, indicated by "L" and defined between the intersection points of the continuations of side walls 51 with the surface of the tread, preferably comprised between 6 mm and 15 mm.

Tread band 3 has a thickness "M" which is preferably comprised between 4 and 11 mm, while groove 50 has a depth "N" which is preferably comprised between 3 and 8 mm, and the value of the ratio N/M between the abovementioned dimensions is preferably comprised between 0.8 and 1 and more preferably equal to about 0.9.

Moreover, it has been found that blind grooves 7 and 20 (FIG. 5), which have a dimension greater than that of the tyre footprint in the same direction, form not only the means which have to perform the function of preventing the phenomenon of aquaplaning, but also means for signalling an insufficient inflation pressure of the tyre.

In fact, if the air pressure is below the nominal value, it has been noticed that the noise level of the tyre increases during its rolling on the ground.

The drop in the inflation pressure results in a greater compression of the tyre and therefore in an increase in the tyre footprint, with the consequent covering of the blind grooves, which initially results in a trapping of the air under pressure and, subsequently, in the noisy instantaneous expulsion of the trapped air when the grooves are uncovered again as a consequence of the tyre rotation.

Therefore the tread band, in a very favourable manner, contains in itself an acoustic instrument of the dynamic type which can be used in combination with a preferred method for ascertaining whether the value of the air pressure is lower than a predefined value.

The blind grooves, indicated by S in FIG. 2, must have the maximum distance between two points A, B of their extension, the latter being the circumferential length or the axial width, which is preferably comprised between 1.01 and 2.5 times the maximum dimension of the tyre footprint in the same direction, and more preferably comprised between 1.01 and 1.5.

Abovementioned distance D must be greater than the dimension of the tyre footprint by an amount which, for a given pressure value of the tyre, corresponds to the threshold value below which the noise level of the tyre increases. In this way the driver of the vehicle is warned that the pressure of the tyre has fallen below the given threshold.

Advantageously the behaviour of the tyre under extreme conditions of use on a dry surface is considerably improved owing to the absence of movable elements (blocks) with respect to the tread band; in fact, isolated blocks cause movements underneath the tyre footprint, known as "block drift" or "floating", which are the cause of imprecision under extreme driving conditions.

The fact of having created a system of cavities, which never intersect each other, enhances the reaction capacity of the tread in response to the external stressing forces.

The fact of having defined grooves with dimensions which are small, but greater than those of the tyre footprint allows an effective water drainage from the tyre footprint and at the same time determines a value for the solid/void ratio (greater surface of solid areas) which is particularly suitable for treads specialized for a very high performance on dry ground.

The blind grooves, which are inclined with respect to the circumferential direction, allow the incorporation of a cavity area into the tread pattern, only minimally affecting the performance of the tyre on dry ground. In fact, the deformability imparted to the pattern is minimal and absolutely smaller than that associated with traditional cavities emerging on the shoulder or with continuous longitudinal cavities which produce instead a circumferential hinge effect.

What is claimed is:

1. A tyre for a vehicle wheel, comprising:
   a tread band;
   wherein the tread band comprises:
   a tread pattern;
   wherein the tread pattern is defined between two shoulder ends of the tyre,
   wherein the shoulder ends of the tyre are axially opposite one another relative to an equatorial plane of the tyre, and
   wherein the tread pattern comprises:
   two lateral rows of grooves; and
   at least one third row of grooves;
   wherein the at least one third row of grooves is arranged between the lateral rows,
   wherein, within each row, the grooves are circumferentially spaced from one another,
   wherein the grooves of the lateral rows axially extend from respective shoulder ends of the tyre to predetermined distances from the equatorial plane of the tyre,
   wherein all of the grooves are separate from one another so as to produce a pattern with no intercommunicating paths between the grooves,
   wherein ends of the grooves of the at least one third row are far from the shoulder ends of the tyre,
   wherein end portions of the grooves of the at least one third row extend outside a footprint of the tyre,
   wherein a greater dimension of each of the grooves of the at least one third row relative to a length of the tyre footprint allows water drainage from underneath the tyre footprint, and
   wherein the grooves of a first lateral row comprise a form different from the grooves of a second lateral row.

2. The tyre of claim 1, wherein a maximum distance between two points of each groove of the at least one third row, measured in a circumferential direction, is greater than a length of the tyre footprint when the tyre is inflated to nominal operating pressure and subjected to nominal load under static conditions.

3. The tyre of claim 1, wherein each groove of the at least one third row comprises a substantially straight portion extending, at a predetermined inclination angle with respect to the equatorial plane of the tyre, between a first end, far from a first shoulder end of the tyre, and a second end, far from a second shoulder end of the tyre.

4. The tyre of claim 1, wherein each groove of a first lateral row:
   starts from a first shoulder end of the tyre; and
   ends in a first straight portion forming an acute angle having a predetermined value with respect to the equatorial plane of the tyre;
   wherein the first straight portion comprises a direction opposite to that of a second straight portion of each groove of a second lateral row with respect to the equatorial plane of the tyre.

5. The tyre of claim 1, wherein the grooves of a first lateral row extend from a shoulder end of the tyre with inclinations comprising, with respect to the equatorial plane of the tyre, a direction opposite to that of the grooves of a second lateral row.

6. The tyre of claim 1, further comprising:
   a fifth row of grooves arranged between the lateral rows;
   wherein the grooves of the fifth row are circumferentially spaced from one another,
   wherein the grooves of the fifth row are separate from those of the lateral rows of grooves and the at least one third row of grooves, and
   wherein the at least one third row of grooves and the fifth row of grooves are symmetrical with one another relative to the equatorial plane of the tyre.

7. A tyre for a vehicle wheel, comprising:
   a tread band;
   wherein the tread band comprises:
   a tread pattern;
   wherein the tread pattern is defined between two shoulder ends of the tyre,
   wherein the shoulder ends of the tyre are axially opposite one another relative to an equatorial plane of the tyre, and
   wherein the tread pattern comprises:
   two lateral rows of grooves; and
   at least one third row of grooves;
   wherein the at least one third row of grooves is arranged between the lateral rows,
   wherein, within each row, the grooves are circumferentially spaced from one another,
   wherein the grooves of the lateral rows axially extend from respective shoulder ends of the tyre to predetermined distances from the equatorial plane of the tyre,
   wherein all of the grooves are separate from one another so as to produce a pattern with no intercommunicating paths between the grooves,
   wherein ends of the grooves of the at least one third row are far from the shoulder ends of the tyre,
   wherein end portions of the grooves of the at least one third row extend outside a footprint of the tyre,
   wherein a greater dimension of each of the grooves of the at least one third row relative to a length of the tyre footprint allows water drainage from underneath the tyre footprint,
   wherein each groove of the at least one third row comprises a substantially straight portion extending, at a predetermined inclination angle with respect to the equatorial plane of the tyre, between a first end, far from a first shoulder end of the tyre, and a second end, far from a second shoulder end of the tyre, and
   wherein the grooves of the at least one third row comprise end portions of the substamtially straight portion shaped accoding to curved arcs having opposite curvatures to one another.

8. A tyre for a vehicle wheel, comprising:
   a tread band;
   wherein the tread band comprises:
   a tread pattern;
   wherein the tread pattern is defined between two shoulder ends of the tyre,
   wherein the shoulder ends of the tyre are axially opposite one another relative to an equatorial plane of the tyre, and wherein the tread pattern comprises:
  two lateral rows of grooves;
  at least one third row of grooves; and
  a fourth row of grooves circumferentially spaced from one another;
wherein the at least one third row of grooves is arranged between the lateral rows,
wherein, within each row, the grooves are circumferentially spaced from one another,
wherein the grooves of the lateral rows axially extend from respective shoulder ends of the tyre to predetermined distances from the equatorial plane of the tyre,
wherein all of the grooves are separate from one another so as to produce a pattern with no intercommunicating paths between the grooves,
wherein ends of the grooves of the at least one third row are far from the shoulder ends of the tyre,
wherein end portions of the grooves of the at least one third row extend outside a footprint of the tyre,
wherein a greater dimension of each of the grooves of the at least one third row relative to a length of the tyre footprint allows water drainage from underneath the tyre footprint,
wherein the fourth row of grooves is separate from the lateral rows of grooves and the at least one third row of grooves,
wherein the grooves of the fourth row start from a shoulder end of the tyre, between two adjacent grooves of a first lateral row, and
wherein the grooves of the fourth row end between two adjacent grooves of the at least one third row.

9. The tyre of claim 8, wherein:
the grooves of the first lateral row and the grooves of the at least one third row form first trajectories;
the grooves of the fourth row and the grooves of a second lateral row form second trajectories;
the first and second trajectories alternate with one another;
the first and second trajectories are circumferentially spaced;
the first and second trajectories comprise a substantially undulating shape with peaks aligned on a circumferential plane parallel to the equatorial plane of the tyre;
the first trajectories comprise an interruption between the grooves of the first lateral row and the grooves of the at least one third row; and
the second trajectories comprise an interruption between the grooves of the fourth row and the grooves of the second lateral row.

10. A tyre for a vehicle wheel, comprising:
a tread band;
wherein the tread band comprises:
  a tread pattern;
wherein the tread pattern is defined between two shoulder ends of the tyre,
wherein the shoulder ends of the tyre are axially opposite one another relative to an equatorial plane of the tyre, and
wherein the tread pattern comprises:
  two lateral rows of grooves; and
  at least one third row of grooves;
wherein the at least one third row of grooves is arranged between the lateral rows,
wherein, within each row, the grooves are circumferentially spaced from one another,
wherein the grooves of the lateral rows axially extend from respective shoulder ends of the tyre to predetermined distances from the equatorial plane of the tyre,
wherein all of the grooves are separate from one another so as to produce a pattern with no intercommunicating paths between the grooves,
wherein ends of the grooves of the at least one third row are far from the shoulder ends of the tyre,
wherein end portions of the grooves of the at least one third row extend outside a footprint of the tyre,
wherein a greater dimension of each of the grooves of the at least one third row relative to a length of the tyre footprint allows water drainage from underneath the tyre footprint,
wherein paths exist along a rolling surface of the tread pattern from a first shoulder end of the tyre to a second shoulder end of the tyre without crossing any of the grooves, and
wherein the grooves of a first lateral row comprise a form different from the grooves of a second lateral row.

11. The tyre of claim 10, wherein a maximum distance between two points of each groove of the at least one third row, measured in a circumferential direction, is greater than a length of the tyre footprint when the tyre is inflated to nominal operating pressure and subjected to nominal load under static conditions.

12. The tyre of claim 10, wherein each groove of the at least one third row comprises a substantially straight portion extending, at a predetermined inclination angle with respect to the equatorial plane of the tyre, between a first end, far from the first shoulder end of the tyre, and a second end, far from the second shoulder end of the tyre.

13. The tyre of claim 10, wherein each groove of a first lateral row:
  starts from the first shoulder end of the tyre; and
  ends in a first straight portion forming an acute angle having a predetermined value with respect to the equatorial plane of the tyre;
  wherein the first straight portion comprises a direction opposite to that of a second straight portion of each groove of a second lateral row with respect to the equatorial plane of the tyre.

14. The tyre of claim 10, wherein the grooves of a first lateral row extend from the first shoulder end of the tyre with inclinations comprising, with respect to the equatorial plane of the tyre, a direction opposite to that of the grooves of a second lateral row.

15. The tyre of claim 10, further comprising:
a fifth row of grooves arranged between the lateral rows;
wherein the grooves of the fifth row are circumferentially spaced from one another,
wherein the grooves of the fifth row are separate from those of the lateral rows of grooves and the at least one third row of grooves, and
wherein the at least one third row of grooves and the fifth row of grooves are symmetrical with one another relative to the equatorial plane of the tyre.

16. A tyre for a vehicle wheel, comprising:
a tread band;
wherein the tread band comprises:
  a tread pattern;
wherein the tread pattern is defined between two shoulder ends of the tyre,
wherein the shoulder ends of the tyre are axially opposite one another relative to an equatorial plane of the tyre, and wherein the tread pattern comprises:
two lateral rows of grooves;
at least one third row of grooves; and
no circumferential grooves;
wherein the at least one third row of grooves is arranged between the lateral rows,
wherein, within each row, the grooves are circumferentially spaced from one another,
wherein the grooves of the lateral rows axially extend from respective shoulder ends of the tyre to predetermined distances from the equatorial plane of the tyre,
wherein all of the grooves are separate from one another so as to produce a pattern with no intercommunicating paths between the grooves,
wherein ends of the grooves of the at least one third row are far from the shoulder ends of the tyre,
wherein end portions of the grooves of the at least one third row extend outside a footprint of the tyre,
wherein a greater dimension of each of the grooves of the at least one third row relative to a length of the tyre footprint allows water drainage from underneath the tyre footprint, and
wherein the grooves of a first lateral row comprise a form different from the grooves of a second lateral row.

17. The tyre of claim 16, wherein a maximum distance between two points of each groove of the at least one third row, measured in a circumferential direction, is greater than a length of the tyre footprint when the tyre is inflated to nominal operating pressure and subjected to nominal load under static conditions.

18. The tyre of claim 16, wherein each groove of the at least one third row comprises a substantially straight portion extending, at a predetermined inclination angle with respect to the equatorial plane of the tyre, between a first end, far from a first shoulder end of the tyre, and a second end, far from a second shoulder end of the tyre.

19. The tyre of claim 16, wherein each groove of a first lateral row:
starts from a first shoulder end of the tyre; and
ends in a first straight portion forming an acute angle having a predetermined value with respect to the equatorial plane of the tyre;
wherein the first straight portion comprises a direction opposite to that of a second straight portion of each groove of a second lateral row with respect to the equatorial plane of the tyre.

20. The tyre of claim 16, wherein the grooves of a first lateral row extend from a shoulder end of the tyre with inclinations comprising, with respect to the equatorial plane of the tyre, a direction opposite to that of the grooves of a second lateral row.

21. The tyre of claim 16, further comprising:
a fifth row of grooves arranged between the lateral rows;
wherein the grooves of the fifth row are circumferentially spaced from one another,
wherein the grooves of the fifth row are separate from those of the lateral rows of grooves and the at least one third row of grooves, and
wherein the at least one third row of grooves and the fifth row of grooves are symmetrical with one another relative to the equatorial plane of the tyre.

22. A tyre for a vehicle wheel, comprising:
a tread band;
wherein the tread band comprises:
a tread pattern;
wherein the tread pattern is defined between two shoulder ends of the tyre,
wherein the shoulder ends of the tyre are axially opposite one another relative to an equatorial plane of the tyre, and
wherein the tread pattern comprises:
two lateral rows of grooves; and
at least one third row of grooves;
wherein the at least one third row of grooves is arranged between the lateral rows,
wherein, within each row, the grooves are circumferentially spaced from one another,
wherein the grooves of the lateral rows axially extend from respective shoulder ends of the tyre to predetermined distances from the equatorial plane of the tyre,
wherein all of the grooves are separate from one another so as to produce a pattern with no intercommunicating paths between the grooves,
wherein ends of the grooves of the at least one third row are far from the shoulder ends of the tyre,
wherein end portions of the grooves of the at least one third row extend outside a footprint of the tyre,
wherein a greater dimension of each of the grooves of the at least one third row relative to a length of the tyre footprint allows water drainage from underneath the tyre footprint,
wherein the grooves of the at least one third row cross the equatorial plane of the tyre, and
wherein the grooves of a first lateral row comprise a form different from the grooves of a second lateral row.

23. The tyre of claim 22, wherein a maximum distance between two points of each groove of the at least one third row, measured in a circumferential direction, is greater than a length of the tyre footprint when the tyre is inflated to nominal operating pressure and subjected to nominal load under static conditions.

24. The tyre of claim 22, wherein each groove of the at least one third row comprises a substantially straight portion extending, at a predetermined inclination angle with respect to the equatorial plane of the tyre, between a first end, far from a first shoulder end of the tyre, and a second end, far from a second shoulder end of the tyre.

25. The tyre of claim 22, wherein each groove of a first lateral row:
starts from a first shoulder end of the tyre; and
ends in a first straight portion forming an acute angle having a predetermined value with respect to the equatorial plane of the tyre;
wherein the first straight portion comprises a direction opposite to that of a second straight portion of each groove of a second lateral row with respect to the equatorial plane of the tyre.

26. The tyre of claim 22, wherein the grooves of a first lateral row extend from a shoulder end of the tyre with inclinations comprising, with respect to the equatorial plane of the tyre, a direction opposite to that of the grooves of a second lateral row.

27. The tyre of claim 22, further comprising:
a fifth row of grooves arranged between the lateral rows;
wherein the grooves of the fifth row are circumferentially spaced from one another, wherein the grooves of the fifth row are separate from those of the lateral rows of grooves and the at least one third row of grooves, and wherein the at least one third row of grooves and the fifth row of grooves are symmetrical with one another relative to the equatorial plane of the tyre.

28. A tyre for a vehicle wheel, comprising:

a tread band;

wherein the tread band comprises:
  a tread pattern:

wherein the tread pattern is defined between two shoulder ends of the tyre, wherein the shoulder ends of the tyre are axially opposite one another relative to an equatorial plane of the tyre, and wherein the tread pattern comprises:
  two lateral rows of grooves; and
  at least one third row of grooves;

wherein the at least one third row of grooves is arranged between the lateral rows, wherein, within each row, the grooves are circumferentially spaced from one another, wherein the grooves of the lateral rows axially extend from respective shoulder ends of the tyre to predetermined distances from the equatorial plane of the tyre, wherein all of the grooves are separate from one another so as to produce a pattern with no intercommunicating paths between the grooves, wherein ends of the grooves of the at least one third row are far from the shoulder ends of the tyre, wherein end portions of the grooves of the at least one third row extend outside a footprint of the tyre, wherein a greater dimension of each of the grooves of the at least one third row relative to a length of the tyre footprint allows water drainage from underneath the tyre footprint, wherein paths exist along a rolling surface of the tread pattern from a first shoulder end of the tyre to a second shoulder end of the tyre without crossing any of the grooves, wherein each groove of the at least one third row comprises a substantially straight portion extending, at a predetermined inclination angle with respect to the equatorial plane of the tyre, between a first end, far from the first shoulder end of the tyre, and a second end, far from the second shoulder end of the tyre, and wherein the grooves of the at least one third row comprise two end portions of the substantially straight portion shaped according to curved arcs having opposite curvatures to one another.

29. A tyre for a vehicle wheel, comprising:

a tread band;

wherein the tread band comprises:
  a tread pattern;

wherein the tread pattern is defined between two shoulder ends of the tyre, wherein the shoulder ends of the tyre are axially opposite one another relative to an equatorial plane of the tyre, and wherein the tread pattern comprises:
  two lateral rows of grooves;
  at least one third row of grooves; and
  a fourth row of grooves circumferentially spaced from one another;

wherein the at least one third row of grooves is arranged between the lateral rows, wherein, within each row, the grooves are circumferentially spaced from one another, wherein the grooves of the lateral rows axially extend from respective shoulder ends of the tyre to predetermined distances from the equatorial plane of the tyre, wherein all of the grooves are separate from one another so as to produce a pattern with no intercommunicating paths between the grooves, wherein ends of the grooves of the at least one third row are far from the shoulder ends of the tyre, wherein end portions of the grooves of the at least one third row extend outside a footprint of the tyre, wherein a greater dimension of each of the grooves of the at least one third row relative to a length of the tyre footprint allows water drainage from underneath the tyre footprint, wherein paths exist alone a rolling surface of the tread pattern from a first shoulder end of the tyre to a second shoulder end of the tyre without crossing any of the grooves, wherein the fourth row of grooves is separate from the lateral rows of grooves and the at least one third row of grooves, wherein the grooves of the fourth row start from the first shoulder end of the tyre, between two adjacent grooves of a first lateral row, and wherein the grooves of the fourth row end between two adjacent grooves of the at least one third row.

30. The tyre of claim 29, wherein:

the grooves of the first lateral row and the grooves of the at least one third row form first trajectories;

the grooves of the fourth row and the grooves of a second lateral row form second trajectories;

the first and second trajectories alternate with one another;

the first and second trajectories are circumferentially spaced;

the first and second trajectories comprise a substantially undulating shape with peaks aligned on a circumferential plane parallel to the equatorial plane of the tyre;

the first trajectories comprise an interruption between the grooves of the first lateral row and the grooves of the at least one third row; and the second trajectories comprise an interruption between the grooves of the fourth row and the grooves of the second lateral row.

31. A tyre for a vehicle wheel, comprising:

a tread band;

wherein the tread band comprises:
  a tread pattern;

wherein the tread pattern is defined between two shoulder ends of the tyre, wherein the shoulder ends of the tyre are axially opposite one another relative to an equatorial plane of the tyre, and wherein the tread pattern comprises:
  two lateral rows of grooves;
  at least one third row of grooves; and
  no circumferential grooves;

wherein the at least one third row of grooves is arranged between the lateral rows, wherein, within each row, the grooves are circumferentially spaced from one another, wherein the grooves of the lateral rows axially extend from respective shoulder ends of the tyre to predetermined distances from the equatorial plane of the tyre, wherein all of the grooves are separate from one another so as to produce a pattern with no intercommunicating paths between the grooves, wherein ends of the grooves of the at least one third row are far from the shoulder ends of the tyre, wherein end portions of the grooves of the at least one third row extend outside a footprint of the tyre, wherein a greater dimension of each of the grooves of the at least one third row relative to a length of the tyre footprint allows water drainage from underneath the tyre footprint, wherein each groove of the at least one third row comprises a substantially straight portion extending, at a predetermined inclination angle with respect to the equatorial plane of the tyre, between a first end, far from a first shoulder end of the tyre, and a second end, far from a second shoulder end of the tyre, and wherein the grooves of the at least one third row comprise two end portions of the substantially straight portion shaped according to curved arcs having opposite curvatures to one another.

32. A tyre for a vehicle wheel, comprising:

a tread band;

wherein the tread band comprises:
a tread pattern;

wherein the tread pattern is defined between two shoulder ends of the tyre, wherein the shoulder ends of the tyre are axially opposite one another relative to an equatorial plane of the tyre, and wherein the tread pattern comprises:
two lateral rows of grooves;
at least one third row of grooves;
a fourth row of grooves circumferentially spaced from one another; and
no circumferential grooves;

wherein the at least one third row of grooves is arranged between the lateral rows, wherein, within each row, the grooves are circumferentially spaced from one another, wherein the grooves of the lateral rows axially extend from respective shoulder ends of the tyre to predetermined distances from the equatorial plane of the tyre, wherein all of the grooves are separate from one another so as to produce a pattern with no intercommunicating paths between the grooves, wherein ends of the grooves of the at least one third row are far from the shoulder ends of the tyre, wherein end portions of the grooves of the at least one third row extend outside a footprint of the tyre, wherein a greater dimension of each of the grooves of the at least one third row relative to a length of the tyre footprint allows water drainage from underneath the tyre footprint, wherein the fourth row of grooves is separate from the lateral rows of grooves and the at least one third row of grooves, wherein the grooves of the fourth row start from a shoulder end of the tyre, between two adjacent grooves of a first lateral row, and wherein the grooves of the fourth row end between two adjacent grooves of the at least one third row.

33. The tyre of claim 32, wherein:

the grooves of the first lateral row and the grooves of the at least one third row form first trajectories;

the grooves of the fourth row and the grooves of a second lateral row form second trajectories;

the first and second trajectories alternate with one another;

the first and second trajectories are circumferentially spaced;

the first and second trajectories comprise a substantially undulating shape with peaks aligned on a circumferential plane parallel to the equatorial plane of the tyre;

the first trajectories comprise an interruption between the grooves of the first lateral row and the grooves of the at least one third row; and the second trajectories comprise an interruption between the grooves of the fourth row and the grooves of the second lateral row.

34. A tyre for a vehicle wheel, comprising:

a tread band;

wherein the tread band comprises:
a tread pattern;

wherein the tread pattern is defined between two shoulder ends of the tyre, wherein the shoulder ends of the tyre are axially opposite one another relative to an equatorial plane of the tyre, and wherein the tread pattern comprises:
two lateral rows of grooves; and
at least one third row of grooves;

wherein the at least one third row of grooves is arranged between the lateral rows, wherein, within each row, the grooves are circumferentially spaced from one another, wherein the grooves of the lateral rows axially extend from respective shoulder ends of the tyre to predetermined distances from the equatorial plane of the tyre, wherein all of the grooves are separate from one another so as to produce a pattern with no intercommunicating paths between the grooves, wherein ends of the grooves of the at least one third row are far from the shoulder ends of the tyre, wherein end portions of the grooves of the at least one third row extend outside a footprint of the tyre, wherein a greater dimension of each of the grooves of the at least one third row relative to a length of the tyre footprint allows water drainage from underneath the tyre footprint, wherein the grooves of the at least one third row cross the equatorial plane of the tyre, wherein each groove of the at least one third row comprises a substantially straight portion extending, at a predetermined inclination angle with respect to the equatorial plane of the tyre, between a first end, far from a first shoulder end of the tyre, and a second end, far from a second shoulder end of the tyre, and wherein the grooves of the at least one third row comprise two end portions of the substantially straight portion shaped according to curved arcs having opposite curvatures to one another.

35. A tyre for a vehicle wheel, comprising:
a tread band;
wherein the tread band comprises:
a tread pattern;
wherein the tread pattern is defined between two shoulder ends of the tyre,
wherein the shoulder ends of the tyre are axially opposite one another relative to an equatorial plane of the tyre, and
wherein the tread pattern comprises:
two lateral rows of grooves;
at least one third row of grooves; and
a fourth row of grooves circumferentially spaced from one another;
wherein the at least one third row of grooves is arranged between the lateral rows,
wherein, within each row, the grooves are circumferentially spaced from one another,
wherein the grooves of the lateral rows axially extend from respective shoulder ends of the tyre to predetermined distances from the equatorial plane of the tyre,
wherein all of the grooves are separate from one another so as to produce a pattern with no intercommunicating paths between the grooves,
wherein ends of the grooves of the at least one third row are far from the shoulder ends of the tyre,
wherein end portions of the grooves of the at least one third row extend outside a footprint of the tyre,
wherein a greater dimension of each of the grooves of the at least one third row relative to a length of the tyre footprint allows water drainage from underneath the tyre footprint,
wherein the grooves of the at least one third row cross the equatorial plane of the tyre,
wherein the fourth row of grooves is separate from the lateral rows of grooves and the at least one third row of grooves,
wherein the grooves of the fourth row start from a shoulder end of the tyre, between two adjacent grooves of a first lateral row, and
wherein the grooves of the fourth row end between two adjacent grooves of the at least one third row.

36. The tyre of claim 35, wherein:
the grooves of the first lateral row and the grooves of the at least one third row form first trajectories;
the grooves of the fourth row and the grooves of a second lateral row form second trajectories;
the first and second trajectories alternate with one another;
the first and second trajectories are circumferentially spaced;
the first and second trajectories comprise a substantially undulating shape with peaks aligned on a circumferential plane parallel to the equatorial plane of the tyre;
the first trajectories comprise an interruption between the grooves of the first lateral row and the grooves of the at least one third row; and
the second trajectories comprise an interruption between the grooves of the fourth row and the grooves of the second lateral row.

* * * * *

UNITED STATES PATENT AND TRADEMARK OFFICE
CERTIFICATE OF CORRECTION

PATENT NO. : 6,776,204 B2
DATED : August 17, 2004
INVENTOR(S) : Riccardo Cesarini et al.

It is certified that error appears in the above-identified patent and that said Letters Patent is hereby corrected as shown below:

Column 16,
Line 54, after "comprise", insert -- two --.
Line 55, "substamtially" should read -- substantially --.
Line 56, "accoding" should read -- according --.

Column 22,
Line 20, "alone" should read -- along --.

Signed and Sealed this

Fifteenth Day of February, 2005

JON W. DUDAS
*Director of the United States Patent and Trademark Office*